(12) United States Patent
Ishikawa

(10) Patent No.: US 10,040,341 B2
(45) Date of Patent: Aug. 7, 2018

(54) DOOR SEAL STRUCTURE

(71) Applicant: HONDA MOTOR CO., LTD., Tokyo (JP)

(72) Inventor: Akira Ishikawa, Wako (JP)

(73) Assignee: HONDA MOTOR CO., LTD., Toyota (JP)

( * ) Notice: Subject to any disclaimer, the term of this patent is extended or adjusted under 35 U.S.C. 154(b) by 0 days.

(21) Appl. No.: 15/298,769

(22) Filed: Oct. 20, 2016

(65) Prior Publication Data

US 2017/0113527 A1    Apr. 27, 2017

(30) Foreign Application Priority Data

Oct. 22, 2015    (JP) .................... 2015-207724

(51) Int. Cl.
*B60J 10/25*    (2016.01)
*B60J 10/21*    (2016.01)
*B60J 10/86*    (2016.01)

(52) U.S. Cl.
CPC .............. *B60J 10/25* (2016.02); *B60J 10/21* (2016.02); *B60J 10/86* (2016.02)

(58) Field of Classification Search
CPC ... B60J 10/25; B60J 10/21; B60J 10/24; B60J 10/80; B60J 10/86; B60J 10/87
USPC ............................................ 49/479.1, 476.1
See application file for complete search history.

(56) References Cited

U.S. PATENT DOCUMENTS

| | | | | |
|---|---|---|---|---|
| 5,209,546 A | * | 5/1993 | Hasegawa ................ | B60J 7/022 296/154 |
| 5,269,101 A | * | 12/1993 | Nozaki .................... | B60J 10/21 49/479.1 |
| 5,732,998 A | * | 3/1998 | Otsuka .................... | B60R 13/07 296/208 |
| 6,237,287 B1 | * | 5/2001 | Nakagawa ............... | B60J 10/21 49/479.1 |
| 6,443,519 B1 | * | 9/2002 | Betzl ...................... | B60J 7/0084 296/146.9 |

(Continued)

FOREIGN PATENT DOCUMENTS

| JP | 3-72019 U1 | 7/1991 |
|---|---|---|
| JP | H5-084520 U | 11/1993 |

(Continued)

OTHER PUBLICATIONS

Office Action dated Jun. 27, 2017, issued in counterpart Japanese Patent Application No. 2015-207724, with English machine translation. (8 pages).

(Continued)

*Primary Examiner* — Justin B Rephann
(74) *Attorney, Agent, or Firm* — Westerman, Hattori, Daniels & Adrian, LLP

(57) ABSTRACT

A seal member includes a seal body in which a lower seal portion along a lower edge of a door and an intersection seal portion that follows an edge of the door intersecting the lower edge are formed integrally with each other, and a drainage hole that opens on an upper edge side of the lower seal portion and via which a vehicle interior side of the lower seal portion is in communication with a vehicle exterior side of the lower seal portion. The seal member is installed on an edge portion of an inner surface of the door and interposed between the door and a vehicle body when the door is closed.

7 Claims, 6 Drawing Sheets

(56) References Cited

U.S. PATENT DOCUMENTS

| | | | | |
|---|---|---|---|---|
| 6,641,205 | B1* | 11/2003 | Russell | B60J 5/0479 296/146.9 |
| 6,725,605 | B2* | 4/2004 | Schlachter | B60J 10/88 49/479.1 |
| 6,810,624 | B2* | 11/2004 | Fujimura | B60J 10/80 296/146.9 |
| 7,788,853 | B2* | 9/2010 | Narimatsu | B60R 13/0243 296/146.7 |
| 8,458,959 | B2* | 6/2013 | Ohtake | B60J 5/0402 49/479.1 |
| 8,898,958 | B2* | 12/2014 | Filipczak | B60J 10/78 296/146.15 |
| 2002/0139054 | A1* | 10/2002 | Schlachter | B60J 10/88 49/479.1 |
| 2004/0163321 | A1* | 8/2004 | Yamaoka | B60J 10/25 49/479.1 |
| 2004/0216384 | A1* | 11/2004 | Teramoto | B60J 10/24 49/479.1 |
| 2004/0250474 | A1* | 12/2004 | Kubo | B29C 45/0053 49/479.1 |
| 2005/0028448 | A1* | 2/2005 | Mizutani | B60J 10/24 49/479.1 |
| 2005/0050800 | A1* | 3/2005 | Ueda | B60J 10/21 49/479.1 |
| 2011/0252707 | A1* | 10/2011 | Masumoto | B60J 5/0479 49/476.1 |
| 2012/0159858 | A1* | 6/2012 | Mori | B60J 10/24 49/476.1 |
| 2012/0159861 | A1* | 6/2012 | Mori | B60J 10/248 49/495.1 |
| 2013/0019538 | A1* | 1/2013 | Watson | B60J 10/081 49/484.1 |
| 2014/0049067 | A1* | 2/2014 | Kasuya | B60R 13/043 296/146.5 |
| 2014/0059940 | A1* | 3/2014 | Eguchi | B60J 10/0017 49/479.1 |
| 2014/0306480 | A1* | 10/2014 | Sasaki | B60J 10/02 296/93 |
| 2015/0007504 | A1* | 1/2015 | Inai | B60J 10/84 49/483.1 |
| 2015/0251529 | A1* | 9/2015 | Ide | B60J 10/0094 49/476.1 |
| 2015/0360547 | A1* | 12/2015 | Ogawa | B60J 5/0479 49/368 |
| 2016/0221426 | A1* | 8/2016 | Halliwell | B60R 13/0243 |
| 2016/0368356 | A1* | 12/2016 | Amagai | B60J 10/22 |
| 2017/0021708 | A1* | 1/2017 | Thiele | B60J 10/25 |

FOREIGN PATENT DOCUMENTS

| | | |
|---|---|---|
| JP | 8-40074 | 2/1996 |
| JP | 2000-264073 A | 9/2000 |
| JP | 2007-276608 A | 10/2007 |
| JP | 2008-239138 A | 10/2008 |
| JP | 2014-54953 A | 3/2014 |

OTHER PUBLICATIONS

Office Action dated Jan. 9, 2018, issued in counterpart Japanese Application No. 2015-207724, with English translation (6 pages).

* cited by examiner

DOOR SEAL STRUCTURE

CROSS REFERENCES TO RELATED APPLICATIONS

The present application claims priority under 35 U.S.C. § 119 to Japanese Patent Application No. 2015-207724, filed Oct. 22, 2015, entitled "Door Seal Structure." The contents of this application are incorporated herein by reference in their entirety.

TECHNICAL FIELD

The present disclosure relates to a door seal structure that seals a space between a vehicle body and a door.

BACKGROUND

Conventionally, a weather strip is installed as a seal material to shield against rainwater that enters from a space between a door and a vehicle body and against, a noise of the vehicle exterior.

In Japanese Unexamined Patent Application Publication No. 2014-54953, for example, the appearance of wrinkles is prevented when the weather strip is attached to the inner surface of a rear-seat door so as to follow the shape of a wheel house on the rear wheel side while being curved.

SUMMARY

A seal member disclosed in Japanese Unexamined Patent Application Publication No. 2014-54953 is configured to include an arch seal portion that follows the shape of the wheel house and a lower seal portion along the lower edge of the door that are disposed as separated members in order to ensure the capacity to drain water from the vehicle interior to the vehicle exterior. Such a configuration, however, results in a poor appearance because a painted surface of the door is seen from a joint between the arch seal portion and the lower seal portion and thus has a problem of a poor external appearance.

The present application describes, for example, a door seal structure having a drainage capacity and a good external appearance.

According to a first aspect, of the present application, a door seal structure includes a seal member that is installed on an edge portion of an inner surface of a door and that is interposed between the door and a vehicle body when the door is closed. The seal member includes a seal body in which a lower seal portion along a lower edge of the door and an intersection seal portion that follows an edge of the door intersecting the lower edge are formed integrally with each other, and a drainage hole that opens on an upper edge side of the lower seal portion and via which a vehicle interior side is in communication with a vehicle exterior side.

With such a configuration, since the lower seal portion and the intersection seal portion are formed integrally with each other, and the drainage hole is formed on the upper edge side of the lower seal portion, the painted surface of the vehicle body, which is conventionally visible, can be prevented from being seen from a space of the seal member. Thus, the external appearance can be improved without reducing the drainage capacity.

In the door seal structure, the drainage hole is preferably formed near a position at which the lower seal portion intersects the intersection seal portion.

Water is likely to collect at the position at which the lower seal portion intersects the intersection seal portion when a vehicle is situated on an inclined plane such that the rear side is lower than the front side. For this reason, the drainage hole is formed near the position at which the lower seal portion intersects the intersection seal portion. With such a configuration, water can be drained from the position at which the water is likely to collect to the outside, and efficient drainage can be achieved.

In the door seal structure, the seal member preferably includes a substantially triangular connecting plate at a position of an interior angle portion interposed between the lower seal portion and the intersection seal portion, and the drainage hole preferably opens through a lower edge portion of the connecting plate.

With such a configuration, since the substantially triangular connecting plate is disposed at the position of the interior angle portion interposed between the lower seal portion and the intersection seal portion, and the drainage hole opens through the connecting plate, the seal member can cover, for example, a weld mark of the inner surface of the door over a wider range. Thus, the external appearance can be further improved without reducing the drainage capacity.

In the door seal structure, the lower seal portion preferably includes a lower close-contact portion protruding toward a vehicle body side, a hollow chamber that is concave on a back surface side of the lower close-contact portion so as to follow an external shape of the lower close-contact portion and that is in communication with the vehicle interior side via the drainage hole, a channel wall extending upward from a bottom portion of the hollow chamber and along the inner surface of the door, and a drainage channel formed of the channel wall and an inner surface of the lower close-contact portion forming the hollow chamber.

With such a configuration, since the drainage channel is formed in the front-rear direction of the vehicle, water that has collected between the door and the seal member can be efficiently drained to the vehicle exterior via the drainage channel. This suppresses the freeze of water that has collected between the vehicle body and the seal member and remains when the temperature is low and enables desirable door-opening and -closing characteristics and good external appearance to be maintained.

In addition, the hollow chamber and the drainage channel can be used to extract a core used for forming the hollow chamber in a process of injection molding the seal member. Thus, shape of a mold can be simplified.

In the door seal structure, the seal member preferably includes a hooked cover formed so as to extend toward the inner surface of the door and so as to cover and overlap the drainage hole at an end thereof.

With such a configuration, since the cover is formed so as to cover and overlap the drainage hole with space therebetween, the cover can conceal an area that is visible from the drainage hole of the inner surface of the door. Thus, the color of a portion around the drainage hole can be the same as the color of the seal member, and the external appearance can be further improved.

In addition, in the case where the cover is disposed between the drainage hole and the surface of an installed portion, water entering the drainage hole flows along the cover and is drained. Accordingly, the water does not splash in the seal member and can be efficiently drained.

In the door seal structure, the door is preferably a rear-seat door, and the intersection seal portion is preferably curved so as to follow a shape of a wheel house of a rear wheel.

With such a configuration, since a lower rear edge portion of the rear-seat door is curved in an arch shape, and the inner surface of the rear-seat door is located at a position at which a passenger who gets in and out of the vehicle can easily see the inner surface, the external appearance can be further improved in a manner in which the lower rear edge portion of the inner surface of the rear-seat door is concealed and the same color is used.

According to the first aspect, of the present application, for example, a door seal structure having a drainage capacity and a good external appearance can be provided.

BRIEF DESCRIPTION OF THE DRAWINGS

The advantages of the disclosure will become apparent in the following description taken in conjunction with the following drawings.

DETAILED DESCRIPTION

An embodiment of the present application will be described in detail with reference to the drawings appropriately. Like symbols designate like components, and a duplicative description is omitted.

Figure 1:
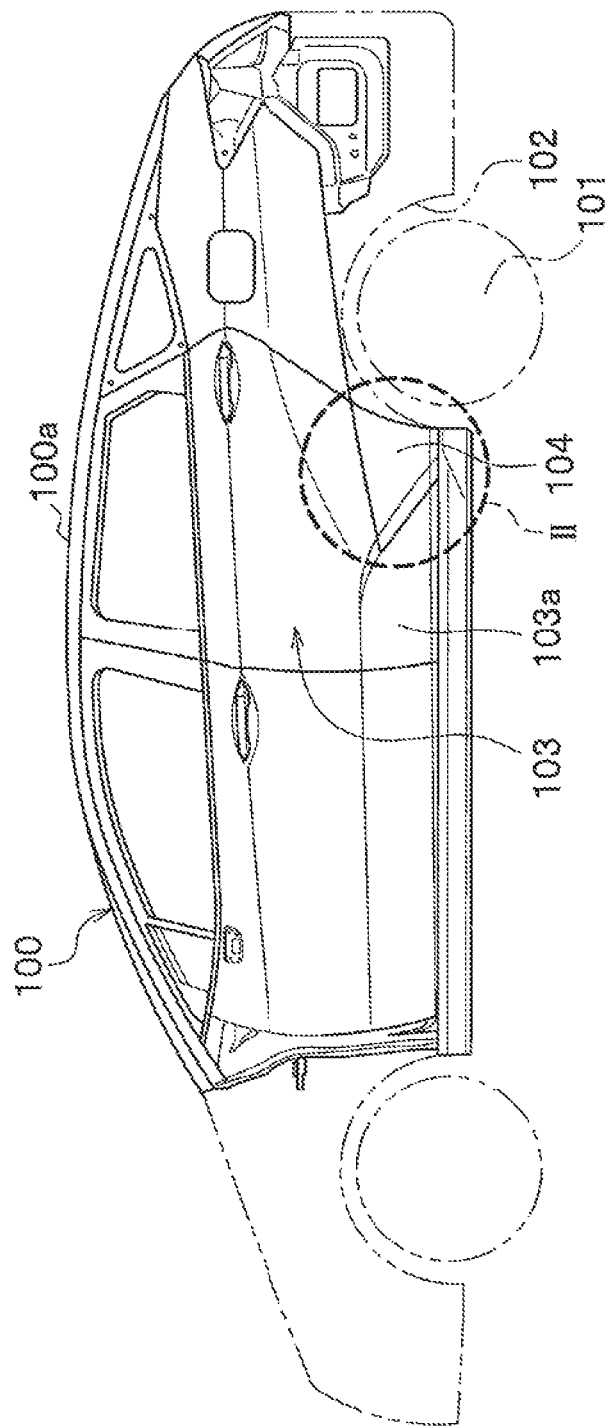
FIG. 1 is a side view of a vehicle body illustrating the shape of the vehicle body in which a seal member according to an embodiment, of the present application is installed.

A door seal structure S according to the embodiment is installed on a rear seat side of a vehicle 100. As illustrated in FIG. 1, a rear edge of a rear-seat, door (door) 103 of the vehicle 100, in which the door seal structure S according to the embodiment is installed, is curved so as to follow the shape of a wheel house 102 of a rear wheel 101.

The door seal structure S seals a space between the rear-seat door 103 and a vehicle body 100a in a manner in which a seal member 11, which is described later, is interposed between the rear-seat door 103 and the vehicle body 100a with the rear-seat door 103 closed.

Figure 2:
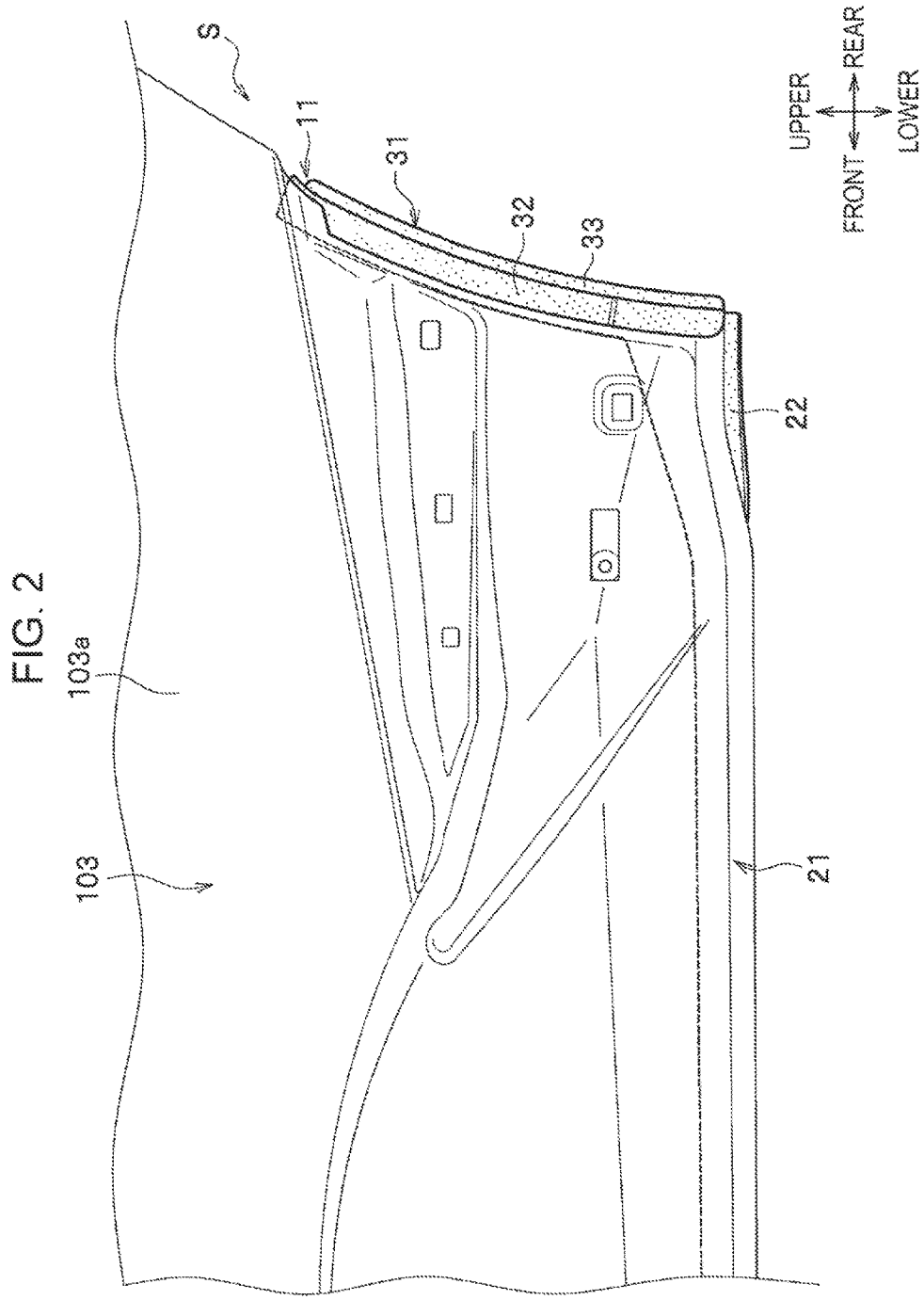
FIG. 2 is an enlarged view of a region II in FIG. 1.

In the door seal structure S according to the embodiment, as illustrated in FIG. 1 and FIG. 2, the seal member 11 is installed on the rear-seat door 103 of the vehicle 100 so as not to be seen from the outside. FIG. 2 illustrates a state where an exterior part 104 is detached for illustrative purposes. Since the exterior part 104 is detached, part of a skirt portion 22 and a hooked catching portion 32, which are described later, are exposed on the side of an outer surface 103a of the door.

Figure 3:
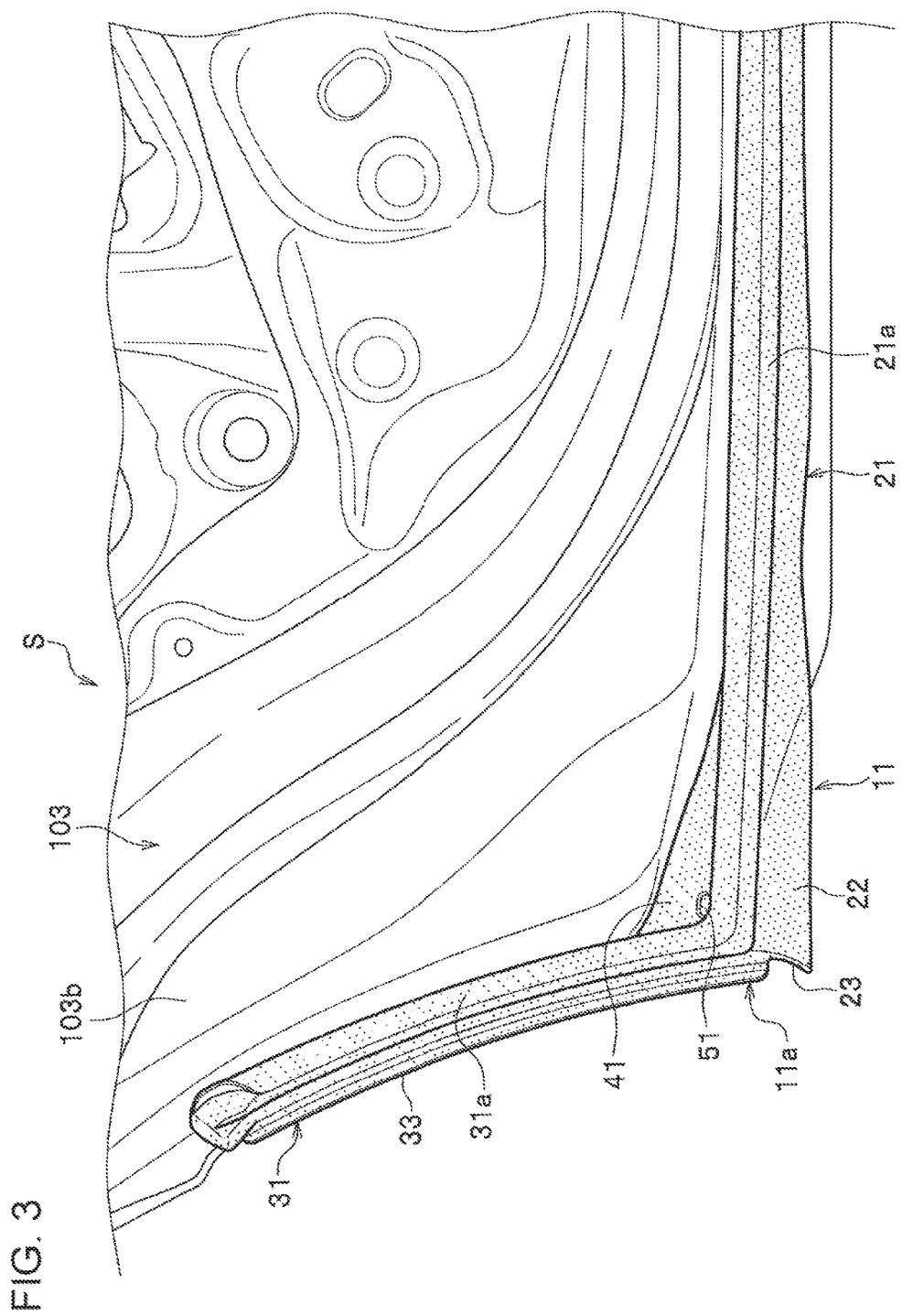
FIG. 3 is an enlarged view of principal parts in FIG. 2 on the vehicle interior side.

As illustrated in FIG. 3, the seal member 11 is installed on an edge portion of an inner surface 103b of the rear-seat door 103. The seal member 11 includes a seal body 11a, a connecting plate 41, a drainage hole 51, and a drainage channel 53 (see FIG. 6). These components are molded integrally with each other in a manner in which an elastic, flexible material such as a rubber material is injection molded.

The seal body 11a includes a lower seal portion 21 and an intersection seal portion 31. In other words, in the seal body 11a, the lower seal portion 21 and the intersection seal portion 31 are formed integrally with each other.

Figure 4:
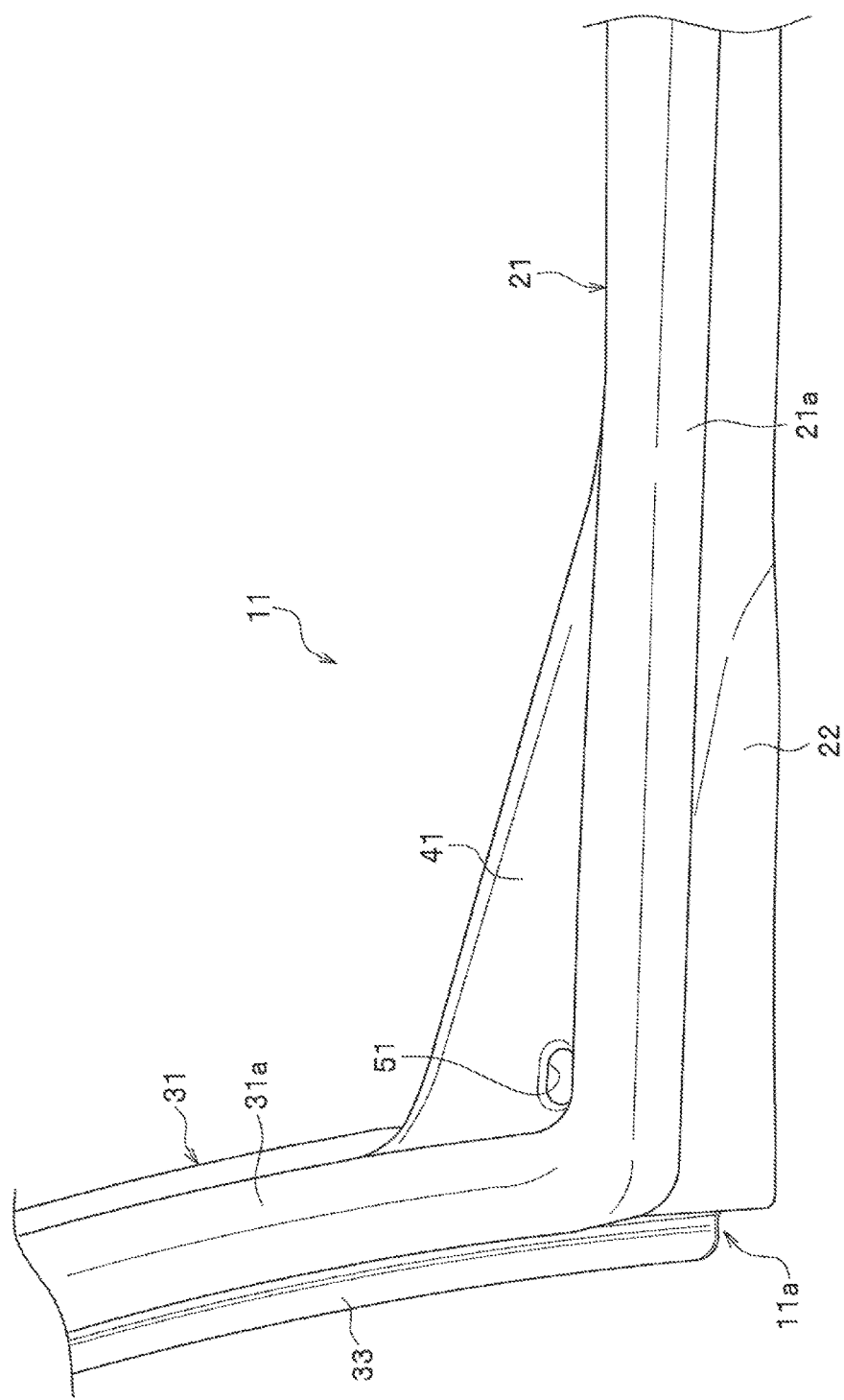
FIG. 4 is a front, view of the seal member according to the embodiment.

As illustrated in FIG. 3 and FIG. 4, the lower seal portion 21 is attached, along the lower edge of the door, to the inner surface 103b of the door that faces the vehicle interior side of the rear-seat door 103. The lower seal portion 21 includes a lower close-contact portion 21a and the skirt portion 22.

The lower close-contact portion 21a seals the space between the rear-seat door 103 and the vehicle body 100a by using a restoring force by which the lower close-contact portion 21a tries to revert to the original shape when the rear-seat door 103 is closed and the lower close-contact portion 21a is compressed within the range of elastic deformation. The lower close-contact portion 21a is substantially semicircular so as to protrude toward the vehicle body side (see FIG. 6). The back surface of the lower close-contact portion 21a is concave so as to follow the external shape of the lower close-contact portion 21a, and a hollow chamber 21b is thereby formed on the back surface side (side of the inner surface 103b of the door). In other words, the lower close-contact portion 21a has a shape of a substantially semicircular arc in section, and an interior hollow portion thereof forms the hollow chamber 21b. The drainage channel 53 is formed in the hollow chamber 21b.

The skirt portion 22 has an arc shape in section, is curved from a lower edge portion of the lower close-contact portion 21a toward the outside of the vehicle 100, extends downward, and extends in the front-rear direction of the vehicle. When the rear-seat door 103 is closed, the skirt portion 22 bends as a result of being pressed from the outside of the arc shape by the vehicle body 100a and comes into contact with an exposed portion of the vehicle body 100a by using the restoring force. The contact of the skirt, portion 22 with the exposed portion of the vehicle 100 prevents water and dust from entering the vehicle interior from below the vehicle. A drainage outlet 23 is formed in a rear portion of the skirt portion 22.

The drainage outlet 23 is in communication with the drainage channel 53, which is described later. Water entering the inside of the lower seal portion 21 passes through the drainage channel 53 and is drained to the vehicle exterior via the drainage outlet 23.

Figure 5:
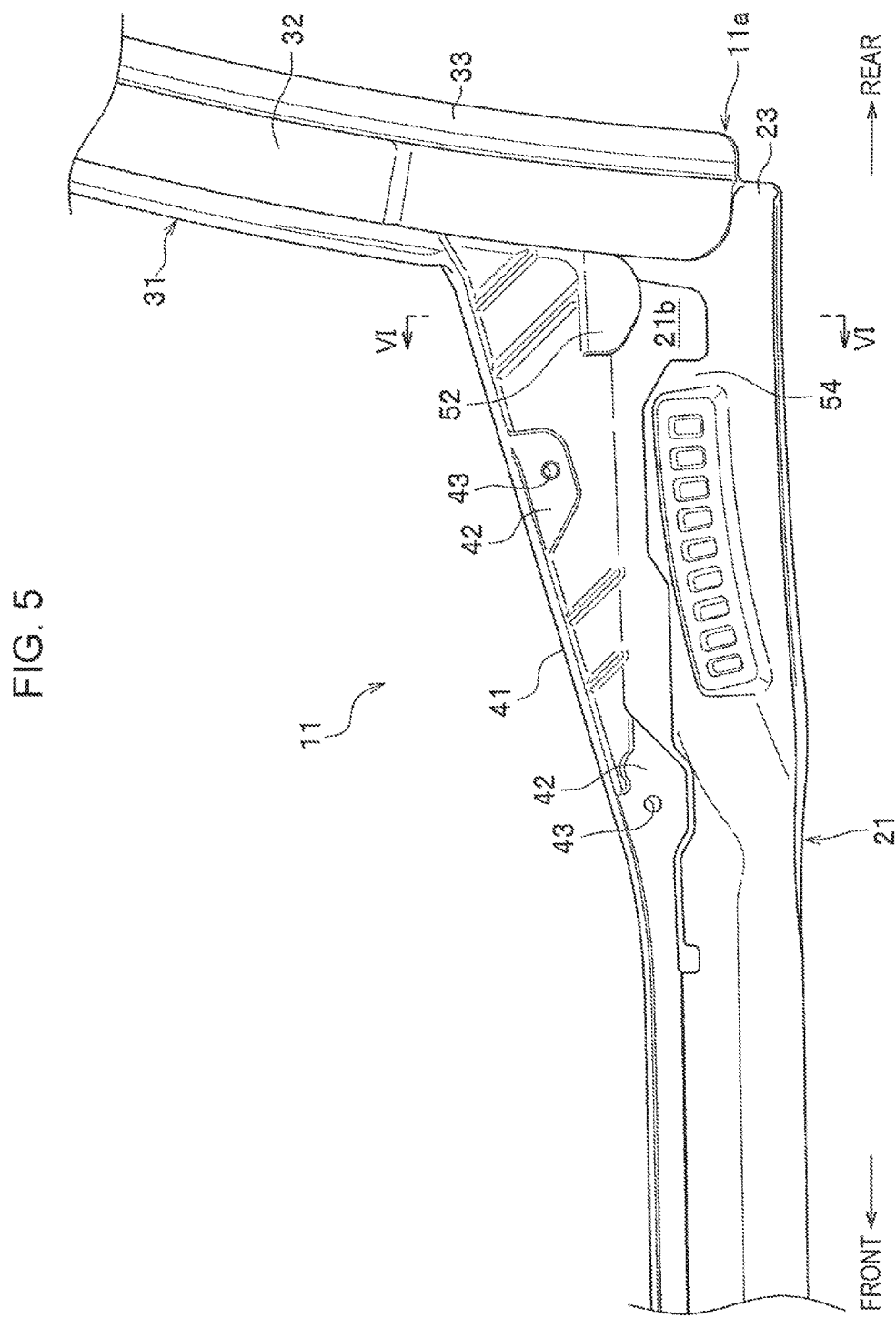
FIG. 5 is a rear view of the seal member according to the embodiment.

As illustrated in FIG. 3 to FIG. 5, the intersection seal portion 31 is disposed on the inner surface 103b of the rear-seat door 103 so as to be curved along the rear edge of the rear-seat door 103. In other words, the intersection seal portion 31 is curved so as to follow the shape of the wheel house 102 of the rear wheel 101. The intersection seal portion 31 includes an intersection close-contact portion 31a, the hooked catching portion 32, and a lip portion 33.

The intersection close-contact portion 31a is substantially semicircular so as to protrude toward the vehicle body side as in the lower close-contact portion 21a. The back surface of the intersection close-contact portion 31a is concave so as to follow the external shape of the intersection close-contact portion 31a, and a hollow chamber is thereby formed on the back surface side (side of the inner surface 103b of the door). In other words, the intersection close-contact portion 31a has a shape of a substantially semicircular arc in section, and an interior hollow portion thereof forms the hollow chamber.

The hooked catching portion 32 is formed on a lower-rear edge portion of the intersection close-contact portion 31a so as to be folded from the side of the inner surface 103b of the door to the side of the outer surface 103a of the door. Thus, the hooked catching portion 32 catches on the lower rear edge portion of the rear-seat door 103 so as to wrap the lower rear edge portion, and the seal member 11 is prevented from flapping and falling from the rear-seat door 103 when the door is opened or closed. The hooked catching portion 32 is interposed between the exterior part 104 and the outer surface of the rear-seat door 103. Thus, the seal member 11 is reliably prevented from flapping and falling from the rear-seat door 103 when the rear-seat door 103 is opened or closed.

The lip portion 33 has a flat-plate shape, protrudes from a folded portion of the hooked catching portion 32 at the rear edge of the rear-seat door 103 toward the rear of the vehicle, and extends along the rear edge of the rear-seat door 103.

Figure 6:
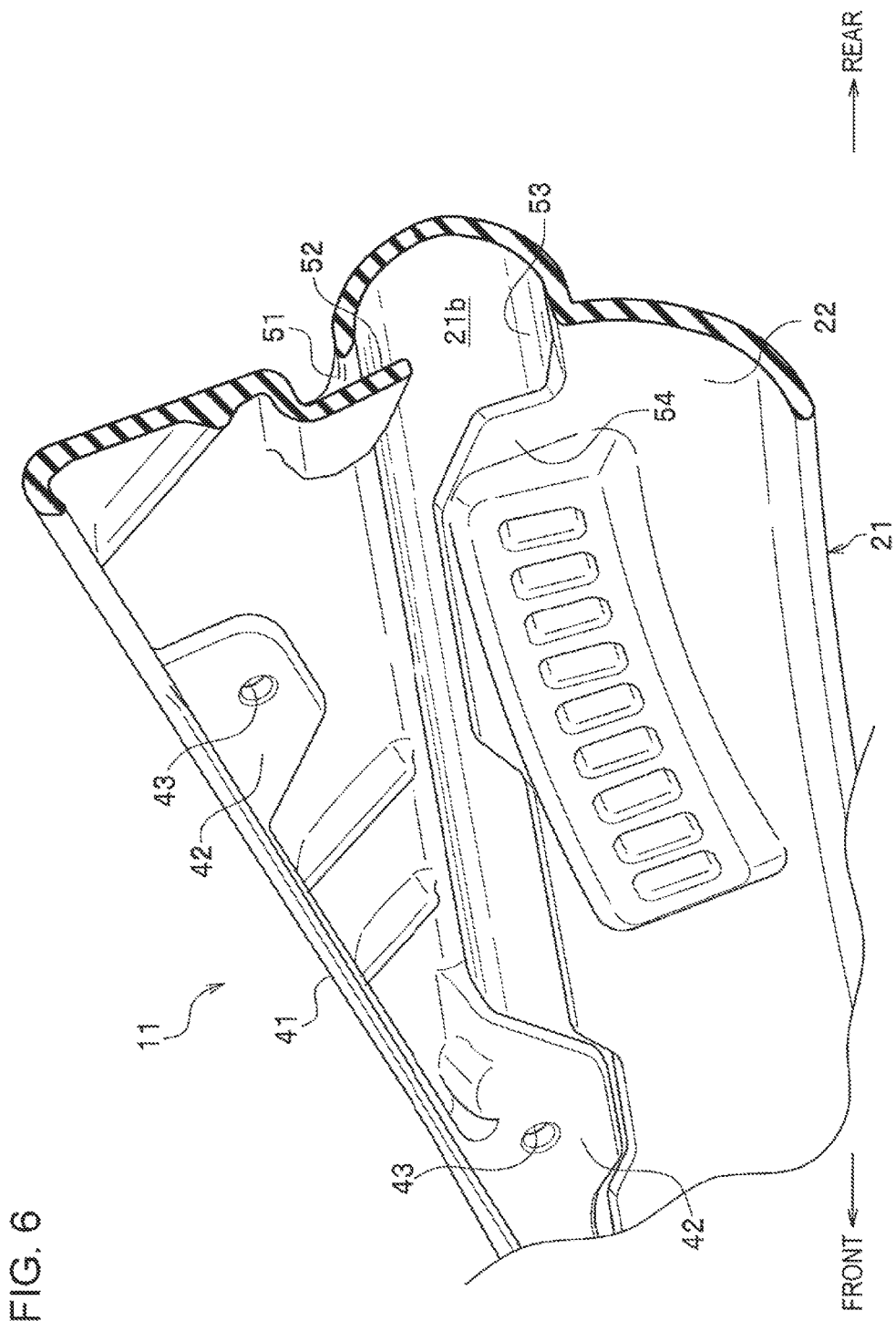
FIG. 6 is a sectional perspective view of the seal member taken along line VI-VI in FIG. 5.

As illustrated in FIG. 4 to FIG. 6, the connecting plate 41 is substantially triangular, is disposed at a position of an interior angle portion interposed between the lower seal portion 21 and the intersection seal portion 31, and connects the lower seal portion 21 and the intersection seal portion 31 diagonally. The connecting plate 41 includes a stationary portion 42 at a portion facing the inner surface 103b of the rear-seat door 103. The drainage hole 51 opens through the connecting plate 41.

The stationary portion 42 has a flat-plate shape and extends from an oblique side portion of the connecting plate 41 so as to face the inner surface 103b of the door. A stationary hole 43 extends thorough the stationary portion 42 in the thickness direction.

A protrusion (not illustrated) in a rivet shape that extends from the inner surface 103b of the rear-seat door 103 and whose end protrudes is inserted into the stationary hole 43, and the end of the protrusion is fastened. Thus, the stationary portion 42 is secured to the protrusion, and the seal member 11 is secured to the inner surface 103b of the door.

As illustrated in FIG. 4 to FIG. 6, the drainage hole 51 is formed near a lower edge portion of the connecting plate 41 at which the lower seal portion 21 intersects the intersection seal portion 31 and on the upper edge side of the lower seal portion 21. The vehicle interior side is in communication with the vehicle exterior side (the hollow chamber 21b) via the drainage hole 51. A cover 52 is disposed between the drainage hole 51 and the inner surface 103b of the door.

The cover 52 is formed in a hook shape such that the cover extends from the upper edge of the drainage hole 51 to the inner surface 103b of the door and an end-side portion thereof extends downward, and covers and overlaps the drainage hole 51 at a predetermined interval. The external shape of the cover 52 is larger than the shape of the drainage hole 51 so that the inner surface 103b of the rear-seat door 103 is not seen when a user looks diagonally through the drainage hole 51.

The drainage channel 53 is formed of a channel wall 54 extending upward from a bottom portion of the hollow chamber 21b and the inner surface of the lower close-contact portion 21a that forms the hollow chamber 21b. The drainage hole 51 opens on the upper side of the drainage channel 53. Accordingly, water entering the drainage hole 51 passes through the drainage channel 53 and is drained to the vehicle exterior via the drainage outlet 23.

Thus, in the door seal structure S according to the embodiment, the seal member 11 is interposed between the rear-seat door 103 and the vehicle body 100a when the rear-seat door 103 is closed. When the seal member 11 is interposed between the rear-seat door 103 and the vehicle body 100a, the lower close-contact portion 21a is compressed within the range of elastic deformation and seals the space between the rear-seat door 103 and the vehicle body 100a by using a restoring force by which the lower close-contact portion 21a tries to revert to the original shape. When the lower close-contact portion 21a seals the space between the rear-seat door 103 and the vehicle body 100a, a groove is formed between the rear-seat door 103 and the vehicle body 100a.

Water spilled in the vehicle interior flows along the inner surface 103b of the door, falls onto the upper edge of the compressed lower close-contact portion 21a, passes through the groove (not illustrated) formed by the upper edge of the compressed lower close-contact, portion 21a, the inner surface 103b of the door, and the vehicle body 100a, and flows to the rear of the vehicle. The water flowing to the rear of the vehicle enters the drainage hole 51 that opens at an intersecting portion of the intersection close-contact portion 31a and falls onto the drainage channel 53. In the case where the entering wafer flows fast, the water collides with the cover 52, accordingly flows along the cover 52 without splashing, and falls onto the drainage channel 53. The water flowing though the drainage channel 53 is drained to the vehicle exterior via the drainage outlet 23.

The door seal structure S according to the embodiment is configured basically as above. The effects of the door seal structure S will be described.

In the door seal structure S according to the embodiment, the lower seal portion 21 and the intersection seal portion 31 are formed integrally with each other, and the drainage hole 51 is formed on the upper edge side of the lower seal portion 21. Accordingly, the painted surface of the vehicle body, which is visible from a space of a conventional seal member, can be concealed. Thus, the external appearance can be improved without reducing the drainage capacity.

Water is likely to collect at the position at which the lower seal portion 21 intersects the intersection seal portion 31 when the vehicle 100 is situated on an inclined plane such that the rear side is lower than the front side. For this reason, in the door seal structure S according to the embodiment, the drainage hole 51 is formed near the position at which the lower seal portion 21 intersects the intersection seal portion 31. This enables the water to be drained from the position at which the water is likely to collect to the outside, thereby enabling efficient drainage.

In the door seal structure S according to the embodiment, the substantially triangular connecting plate 41 is disposed at a position of the interior angle portion interposed between the lower seal portion 21 and the intersection seal portion 31, and the drainage hole 51 opens through the connecting plate 41. Accordingly, the seal member 11 can cover, for example, a weld mark of the inner surface 103b of the door over a wider range. Thus, the external appearance can be further improved without reducing the drainage capacity.

In the door seal structure S according to the embodiment, the drainage channel 53 is formed in the front-rear direction of the vehicle. Accordingly, water that has collected between the rear-seat door 103 and the seal member 11 can be efficiently drained to the vehicle exterior via the drainage channel 53. This suppresses the freeze of the water that has collected between the vehicle body and the seal member and remains when the temperature is low and enables desirable door-opening and -closing characteristics and good external appearance to be maintained.

In addition, the hollow chamber 21b and the drainage channel 53 can be used to extract a core used for forming the hollow chamber 21b in a process of injection molding the seal member 11. Thus, a mold can be simplified.

In the door seal structure S according to the embodiment, the cover 52 is formed so as to cover and overlap the drainage hole 51 at an interval. Accordingly, the cover 52 can conceal an area of the inner surface of the door that is visible from the drainage hole 51. Thus, the color of a portion around the drainage hole 51 can be the same as the color of the seal member 11, and the external appearance can be further improved.

In addition, in the case where the cover 52 is disposed between the drainage hole 51 and the surface of an installed portion, water entering the drainage hole 51 flows along the cover 52 and is drained. Accordingly, the water does not splash in the seal member 11 and can be efficiently drained.

In the door seal structure S according to the embodiment, since the lower rear edge portion of the rear-seat door is curved in an arch shape, and the inner surface 103b of the rear-seat door 103 is located at a position at which a passenger who gets in and out of the vehicle can easily see the inner surface, the external appearance can be further improved in a manner in which the lower rear edge portion of the inner surface of the rear-seat door is concealed and the same color is used. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

What is claimed is:

1. A door seal structure comprising:
   a seal member that is installed on an edge portion of an inner surface of a door and that is interposed between the door and a vehicle body when the door is closed, wherein the seal member includes:
      a seal body comprising a lower seal portion disposed and extending along a lower edge of the door and an intersection seal portion raised upward from a longitudinal end of the lower seal portion, the lower seal portion and the intersection seal portion being formed integrally with each other, and
      a drainage hole that opens at an upper edge side of the lower seal portion and via which a vehicle interior side of the seal member is in communication with a vehicle exterior side of the seal member,
   wherein the seal member includes a substantially triangular connecting plate at a position of an interior angle portion defined between the lower seal portion and the intersection seal portion, and
   wherein the drainage hole opens through a lower edge portion of the connecting plate,
   wherein the seal member includes a hooked cover extending from a back side of the connecting plate toward the inner surface of the door and extending downward to cover the drainage hole.

2. The door seal structure according to claim 1, wherein the drainage hole is disposed in the vicinity of a corner defined by the lower seal portion and the intersection seal portion.

3. The door seal structure according to claim 2, wherein the intersection seal portion is disposed along a rear edge of the door.

4. The door seal structure according to claim 1, wherein the lower seal portion includes
   a lower close-contact portion protruding toward the vehicle body,
   a hollow chamber that is concave on a back surface side of the lower close-contact portion so as to follow a protruding external shape of the lower close-contact portion and that is in communication with the vehicle interior side via the drainage hole,
   a channel wall extending upward from a bottom portion of the hollow chamber along the inner surface of the door, and
   a drainage channel constituted by the channel wall and the back surface of the lower close-contact portion forming the hollow chamber.

5. The door seal structure according to claim 1, wherein the door is a rear-seat door, and
   wherein the intersection seal portion is curved so as to follow a shape of a wheel house of a rear wheel.

6. The door seal structure according to claim 1, wherein the seal member includes a wall extending upward from an upper surface of the lower seal portion, and the wall includes the drainage hole.

7. A vehicle comprising the door seal structure according to claim 1.

* * * * *